United States Patent
Engels

Patent Number: 6,059,665
Date of Patent: May 9, 2000

[54] LINEAR BALL BEARING DRIVE SHAFT

[75] Inventor: Geoffrey P. Engels, Warner Robins, Ga.

[73] Assignee: The United States of America as represented by the Secretary of the Air Force, Washington, D.C.

[21] Appl. No.: 09/094,431

[22] Filed: Jun. 8, 1998

[51] Int. Cl.[7] .................................................. F16C 3/035
[52] U.S. Cl. ........................ 464/167; 464/162; 464/178; 464/906; 384/49
[58] Field of Search .................... 464/167, 162, 464/168, 178; 384/49

[56] References Cited

U.S. PATENT DOCUMENTS

| | | | |
|---|---|---|---|
| Re. 25,489 | 11/1963 | Anderson | 464/168 |
| 754,066 | 3/1904 | Hoffmann | 464/167 |
| 846,079 | 3/1907 | Yost | 464/167 |
| 1,022,909 | 4/1912 | Whitney | 464/167 |
| 2,605,622 | 8/1952 | Anderson | 464/167 |
| 3,186,189 | 6/1965 | Cull | 464/145 |
| 3,203,202 | 8/1965 | Brownyer | 464/167 |
| 3,279,218 | 10/1966 | Chocholek | 464/167 |
| 3,364,699 | 1/1968 | Hufstedler et al. | 464/168 |
| 3,800,558 | 4/1974 | Buthe et al. | 64/23.7 |
| 4,075,872 | 2/1978 | Geisthoff | 464/167 |
| 4,280,341 | 7/1981 | Krude | 403/109.1 |
| 4,819,755 | 4/1989 | Smemo et al. | 180/70.1 |
| 5,651,738 | 7/1997 | Jacob et al. | 464/182 |

*Primary Examiner*—Terry Lee Melius
*Assistant Examiner*—Kenneth Thompson
*Attorney, Agent, or Firm*—Stanton E. Collier

[57] ABSTRACT

The drive shaft assembly has a variable length. Each end of the drive shaft assembly has a flange for attaching to whatever is intend thereon such as a gear box drive or fan mount, and a female threaded attachment on the opposite side of the flange. A slide is secured in this attachment. The slide has a bore therein with longitudinal ball bearing races partially along the length of the wall. Each end of the shaft has opposing ball bearing races as compared to those in the slide and has further thereon an o-ring retainer. A sufficient number of ball bearings are placed in each race to allow for movement of the shaft in the slide. The o-ring is placed on the shaft after the bearings are inserted. After this the slide is secured to the flange.

1 Claim, 2 Drawing Sheets

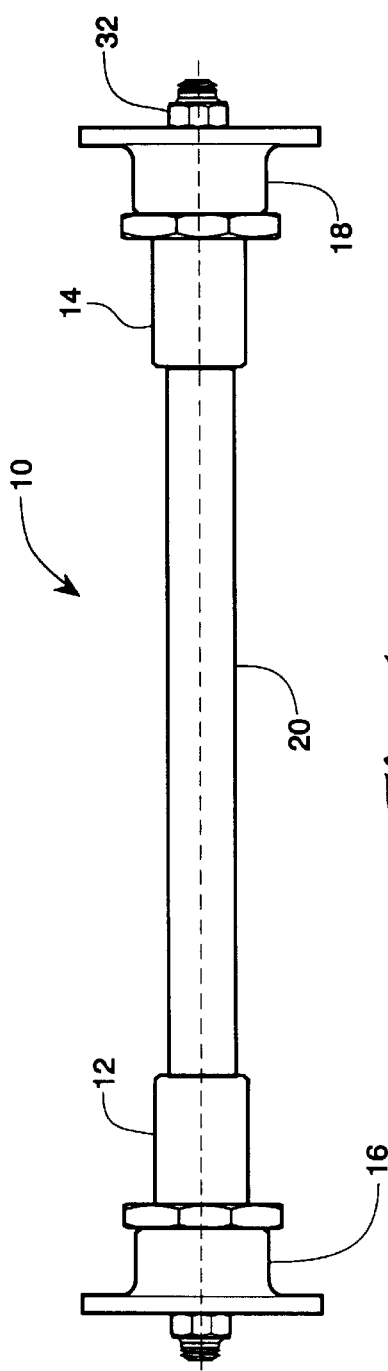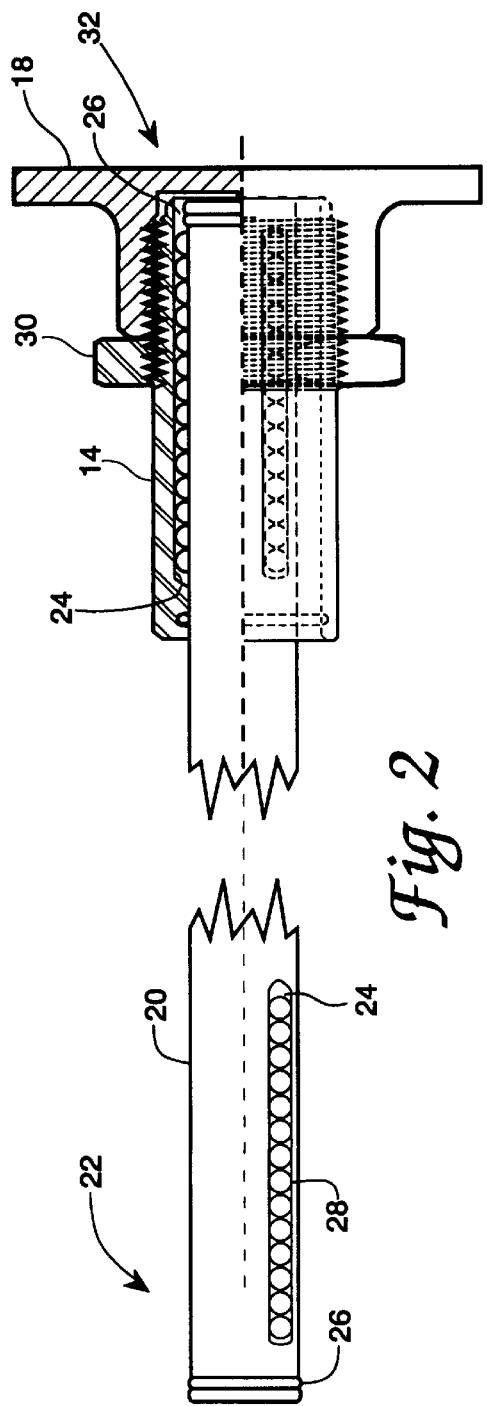

LINEAR BALL BEARING DRIVE SHAFT

The invention described herein may be manufactured and used by or for the Government for governmental purposes without the payment of any royalty thereon.

BACKGROUND OF THE INVENTION

The present invention relates to helicopters, and, in particular, relates to drive shafts for the transfer of power therein.

In the H-53 helicopter, a drive shaft is attached between a drive gear box and a fan to cool, for example, oil. The drive shaft may turn at rpms up to 7,000 rpms and because of this high rpm, slight imbalances at either end will cause vibrations at different amplitudes and frequencies which cause the shaft length to change. This problem in the past was addressed by the use of a male/female splined joint arrangement. In use, this joint has excessive wear and lasts only about 350 to 450 hours before replacement is required. Obviously, this is expensive and time consuming.

Thus, there exists a need for a drive shaft having a longer life.

BRIEF SUMMARY OF THE INVENTION

The drive shaft assembly has a variable length to reduce damage caused by vibrations from the attached devices. Each end of the drive shaft has a flange for attaching to whatever is intend thereon such as a gear box drive or fan, and a female threaded attachment on the opposite side of the flange. A slide is secured in this attachment. The slide has a bore therein with longitudinal ball bearing races partially along the length of the wall. Each end of the shaft has opposing ball bearing races as compared to those in the slide and has further thereon an o-ring retainer. A sufficient number of ball bearings are placed in each race to allow for movement of the shaft in the slide. The o-ring is placed on the shaft after the bearings are inserted. After this the slide is secured to the flange.

Therefore, one object of the present invention is to provide a drive shaft assembly having a longer life than the splined drive shaft.

Another object of the present invention is to provide a drive shaft assembly having ball bearings.

Another object of the present invention is to provide a drive shaft assembly having a variable length.

Another object of the present invention is to provide a drive shaft assembly usable in helicopters wherein a high rate of rpm is applied to the drive shaft.

Another object of the present invention is to provide a drive shaft assembly that reduces the damage from vibrations.

These and many other objects and advantages of the present invention will be ready apparent to one skilled in the pertinent art from the following detailed description of a preferred embodiment of the invention and the related drawings.

BRIEF DESCRIPTION OF THE SEVERAL VIEWS OF THE DRAWINGS

FIG. 1 is a view of the drive shaft assembly.

FIG. 2 is a partial view of the drive shaft inside a flange assembly.

DETAILED DESCRIPTION OF THE INVENTION

Figure 3:
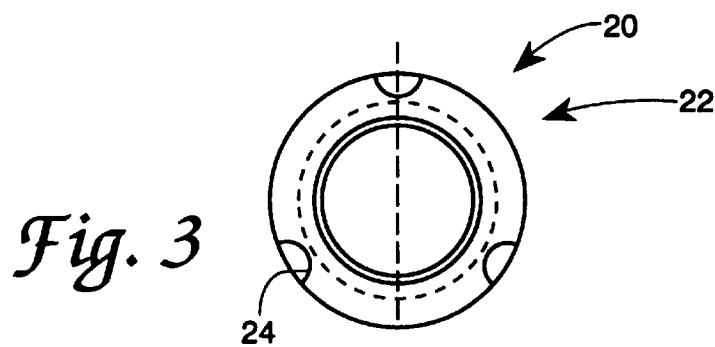
FIG. 3 is an end view of the drive shaft.

Referring to FIG. 1, a drive shaft assembly 10 is shown. The drive shaft assembly has a drive shaft 20 which is inserted into two slides 12 and 14 that are connected to two flanges 16 and 18. The flanges are bolted to whatever device is intended, for example, a drive gear box, a transmission, a fan, etc.

FIG. 2 illustrates the drive shaft 20 with one end 22 exposed that shows one of three ball bearing races 24 on that end 22 with ball bearings 28 therein. The other end being similar, but the race 24 is shown in the slide 14. An o-ring 26 is placed about each end which retains the ball bearings 28 in the tracks 24. The other end 32 is shown within the slide 14 being screwed into the flange 18 with a lock nut 30 thereon.

The inside of the slide 14 has three ball bearing races 24 at appoximately 120 degrees apart. When properly aligned, the drive shaft 20 is inserted into the slide with ball bearings riding in the races on the drive shaft 20 and those on the slide 14. The amount of play is limited by the number of ball bearings in the races. The o-ring 26 prevents the ball bearings from coming off the races on the drive shaft 20 as the shaft 20 is moved from the slide 14.

FIG. 3 illustrates by end view the end 22 of the drive shaft 20. Three races 24 are shown about the outer circumference and are spaced about 120 degrees apart and run axially along the drive shaft 22.

Figure 4:
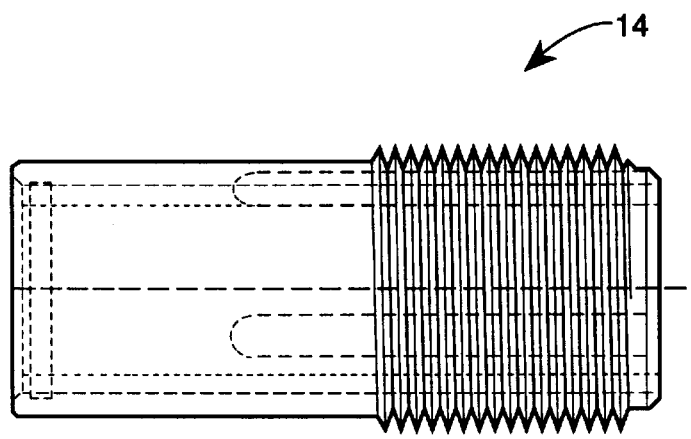
FIG. 4 is a side view of a slide.
Figure 5:
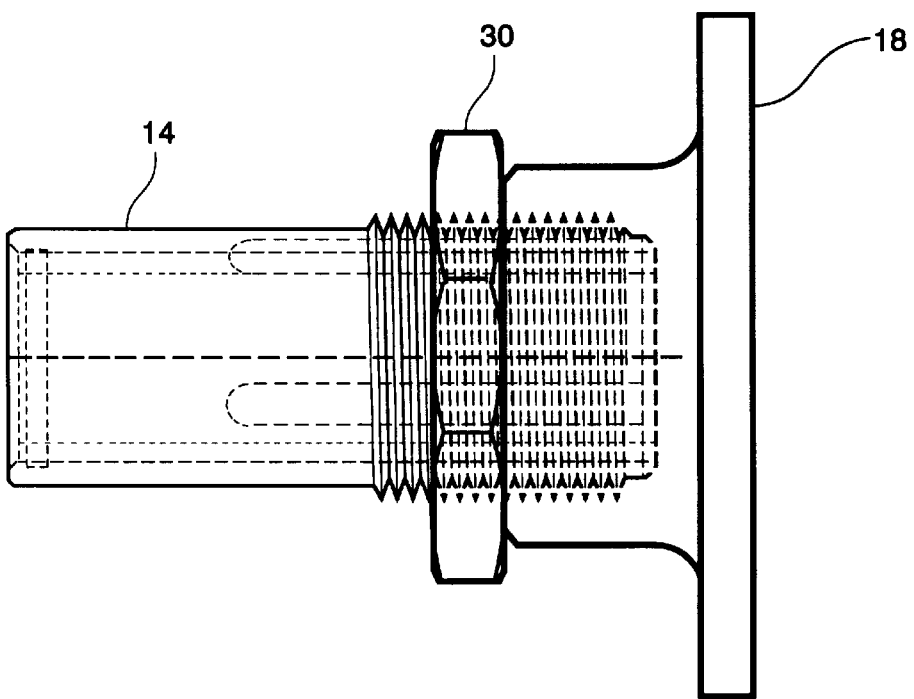
FIG. 5 is a side view of the slide connected to a flange.

FIG. 4 illustrates by side view the slide 14 by itself. The slide 14 has an inner bore with three races therein which are opposite the races of the drive. The races inside the slide do not run the full length of the slide 14 which forces the ball bearings to the end of the shaft as it is moved from the slide 14. FIG. 5 shows the slide 14 screwed into the flange 18 with a lock not 30 securing the slide 14 in the flange 18. Each flange 18 has a grease fitting 32 installed in the center of the flange 18 as shown in FIG. 1.

Although the present invention is used in a helicopter, other applications are possible where the length between the flanges varies in the operation of the drive shaft assembly.

Clearly many modifications and variations of the present invention are possible in light of the above teachings and it is therefore understood, that within the inventive scope of the inventive concept, that the invention may be practiced otherwise than specifically claimed.

What is claimed is:

1. A drive shaft assembly having a variable length, said drive shaft assembly comprising:

a drive shaft, said drive shaft having a plurality of ball bearing races on at least one end, said drive shaft having an o-ring channel between the ball bearings in the ball bearing races and the end of said drive shaft, said o-ring channel being of substantial depth;

at least one o-ring, said o-ring installed in the o-ring channel on said drive shaft, a top of said o-ring being near to an outer surface of said drive shaft when installed, said o-ring preventing the ball bearings in said ball bearing races from coming off the drive shaft and thus limiting the axial movement of said drive shaft;

at least one slide, said slide being installed on said drive shaft, said slide having corresponding ball bearing races therein as upon said drive shaft, said ball bearing races on said slide not extending to an open end on said slide into which said drive shaft is positioned whereby as said drive shaft is pulled from said slide, the ball bearings in said ball bearing races stop and the drive shaft is prevented from further travel by said o-ring abutting against the ball bearings, an outer surface of said slide being threaded on an end opposite to which said shaft enters said slide; and at least one flange, each flange being attached to one slide after said drive shaft is positioned therein, said flange being threaded to fit on threads of said slide, said flange being held thereon by means of a locking nut.

* * * * *